United States Patent
Lehmen et al.

(10) Patent No.: US 11,274,615 B2
(45) Date of Patent: Mar. 15, 2022

(54) METHODS AND SYSTEM FOR ESTIMATING A TEMPERATURE OF AN AFTER TREATMENT DEVICE

(71) Applicant: Ford Global Technologies, LLC, Dearborn, MI (US)

(72) Inventors: Allen Lehmen, Howell, MI (US); Michiel J. Van Nieuwstadt, Ann Arbor, MI (US); Kenneth John Behr, Farmington Hills, MI (US); Daniel Buckrop, Northville, MI (US); Ethan D. Sanborn, Saline, MI (US); Marcus William Fried, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/902,615

(22) Filed: Jun. 16, 2020

(65) Prior Publication Data

US 2021/0388781 A1    Dec. 16, 2021

(51) Int. Cl.
| | |
|---|---|
| *F02D 41/00* | (2006.01) |
| *F02M 25/08* | (2006.01) |
| *F02D 41/30* | (2006.01) |
| *F02D 41/02* | (2006.01) |
| *F02D 41/12* | (2006.01) |
| *F01N 3/20* | (2006.01) |

(52) U.S. Cl.
CPC ....... *F02D 41/004* (2013.01); *F02D 41/0235* (2013.01); *F02D 41/3017* (2013.01); *F02M 25/0836* (2013.01); *F02M 25/0854* (2013.01); *F01N 3/20* (2013.01); *F02D 41/123* (2013.01); *F02D 2200/0804* (2013.01)

(58) Field of Classification Search
CPC ............... F02D 41/004; F02D 41/0235; F02D 41/3017; F02D 41/123; F02D 2200/0804; F02D 17/04; F02M 25/0836; F02M 25/0854; F02M 35/10222; F01N 3/20
See application file for complete search history.

(56) References Cited

U.S. PATENT DOCUMENTS

| | | | |
|---|---|---|---|
| 4,630,581 A * | 12/1986 | Shibata | F02D 41/0032 123/325 |
| 6,820,597 B1 | 11/2004 | Cullen et al. | |
| 7,000,602 B2 | 2/2006 | Cullen et al. | |
| 7,263,433 B2 | 8/2007 | Surnilla et al. | |
| 9,599,052 B2 | 3/2017 | Ranspach et al. | |
| 2002/0139109 A1 * | 10/2002 | Sakanushi | F01N 11/007 60/277 |
| 2005/0115225 A1 * | 6/2005 | Surnilla | F02D 41/0235 60/285 |
| 2009/0070005 A1 * | 3/2009 | Kim | F02D 41/0045 701/103 |
| 2015/0198100 A1 | 7/2015 | Goodall | |
| 2016/0102594 A1 * | 4/2016 | Kumar | F02D 41/1441 73/114.72 |
| 2016/0230707 A1 * | 8/2016 | Tanaka | F01N 3/20 |

* cited by examiner

*Primary Examiner* — George C Jin
(74) *Attorney, Agent, or Firm* — Geoffrey Brumbaugh; McCoy Russell LLP

(57) ABSTRACT

Systems and methods for estimating a temperature of an after treatment device in an exhaust system of an engine are described. In one example, the temperature is estimated during condition when an engine is in a fuel cut-out mode and fuel vapors are being released to the engine via a fuel vapor storage canister.

14 Claims, 8 Drawing Sheets

METHODS AND SYSTEM FOR ESTIMATING A TEMPERATURE OF AN AFTER TREATMENT DEVICE

FIELD

The present description relates to methods and a system for estimating a temperature of an after treatment device and adjusting operation of a vehicle responsive to the temperature. The methods and systems may be particularly useful for vehicles that may include a fuel vapor collection and purging system.

BACKGROUND AND SUMMARY

A vehicle may include an after treatment device for processing exhaust gases of an engine. The after treatment device may oxidize some exhaust gas constituents and reduce other exhaust gas constituents. The after treatment device may be initially heated via exhaust gases. Once it reaches a light off temperature, the after treatment device may reach temperatures that may be higher than exhaust gas temperatures. In particular, hydrocarbons entrained in the exhaust gases may be combusted within the after treatment device so as to raise a temperature of the after treatment device. The temperature of the after treatment device may be increased or decreased via controlling amounts of oxygen and hydrocarbons that are present in the engine's exhaust gases. Operating the after treatment device at temperatures that are higher than a threshold temperature may result in a loss of after treatment device efficiency. Therefore, it may be desirable to accurately determine a temperature of the after treatment device. Nevertheless, installing temperature sensors in the after treatment device may be cost prohibitive.

The inventors herein have recognized the above-mentioned issues and have developed an engine operating method, comprising: operating an engine in a fuel cut-out mode wherein the engine rotates without injecting fuel to the engine via fuel injectors; delivering fuel to the engine via a fuel vapor canister while operating the engine in the fuel cut-out mode; and estimating a temperature of an exhaust after treatment device via a controller, the controller estimating the temperature of the exhaust after treatment device based on combusting fuel supplied from the fuel vapor canister in the exhaust after treatment device while operating the engine in the fuel cut-out mode.

By estimating a temperature of an after treatment device while an engine is operating in a fuel cut-out mode, it may be possible to maintain a temperature of the after treatment device below a threshold temperature. In one example, flow through a canister purge valve may be reduced in response to the estimated temperature of the after treatment device so that the temperature of the after treatment device may be maintained below the threshold temperature. In this way, it may be possible to reduce an amount of fuel vapor stored in a fuel vapor canister so that fuel vapors may not be released to atmosphere while at the same time preserving efficiency of an after treatment device.

The present description may provide several advantages. In particular, the approach may preserve after treatment device efficiency. In addition, the approach may reduce fuel vapors that are stored in a fuel vapor storage canister so that the fuel vapors may not be released to atmosphere. Further, the approach may provide an improved temperature estimate of an after treatment device.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
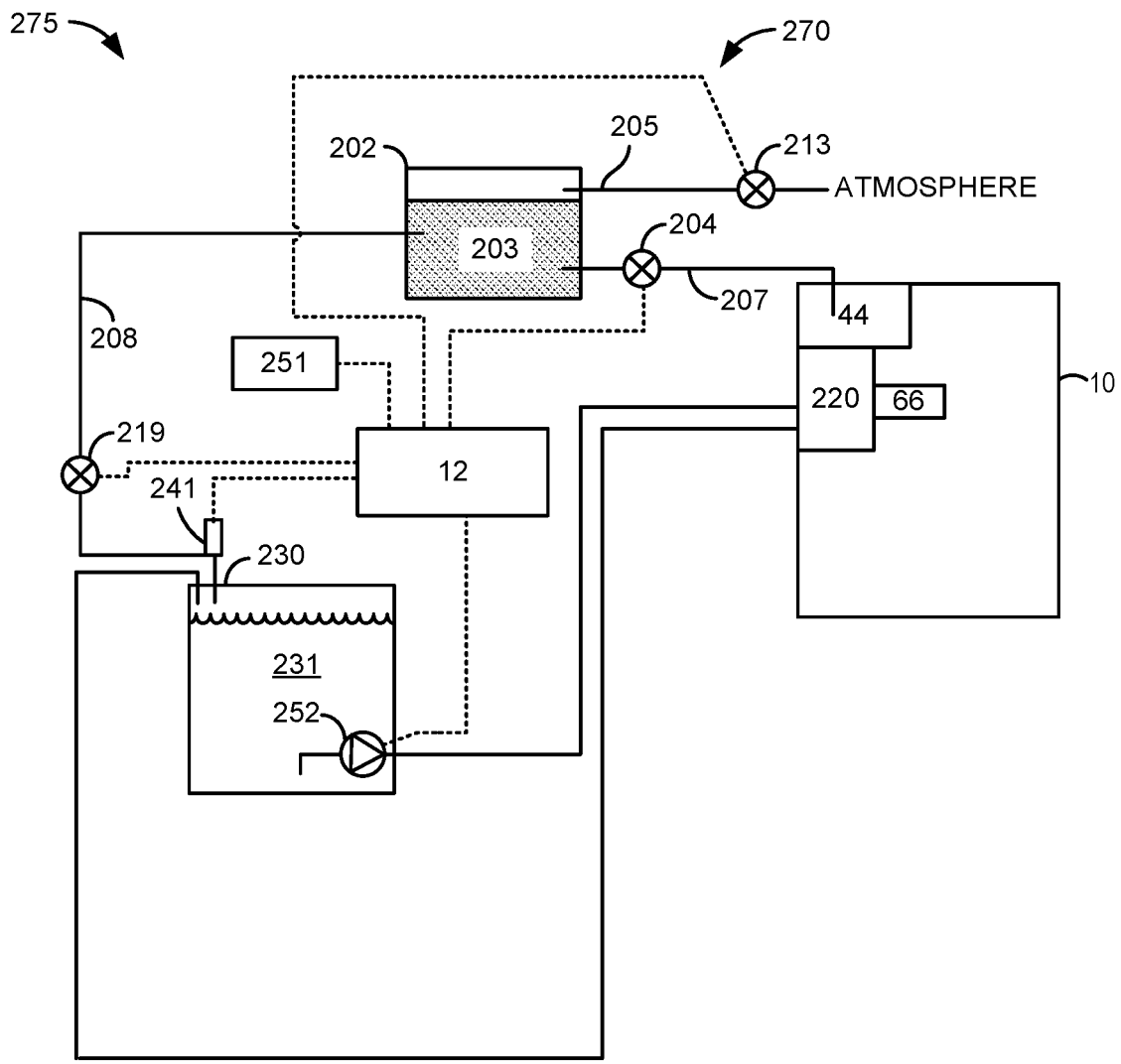
FIG. 2 is a schematic diagram of an evaporative emissions system.
Figure 3A:
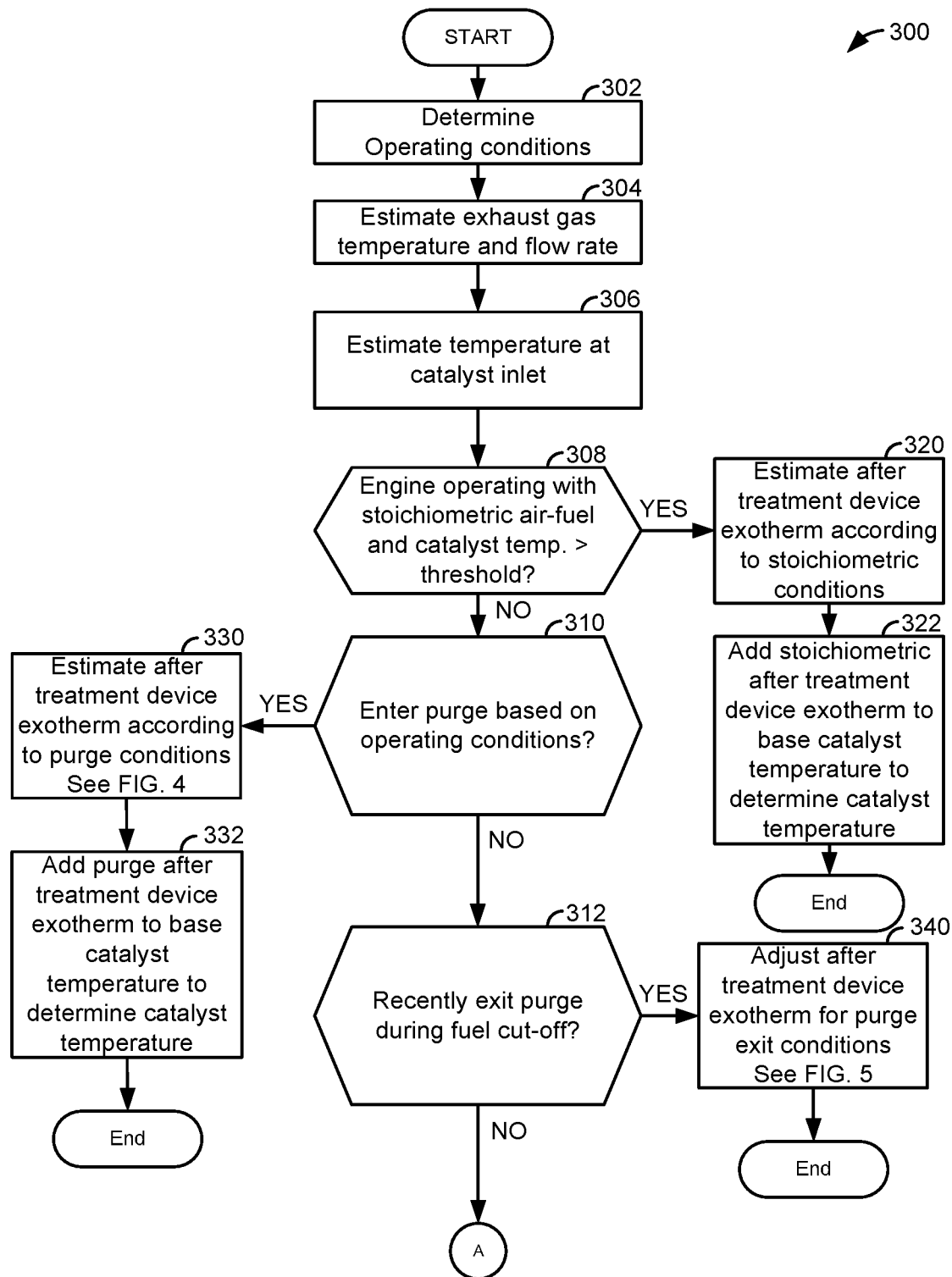
FIGS. 3A-3C is a flowchart of an example method for estimating a temperature of an exhaust after treatment device.
Figure 3B:
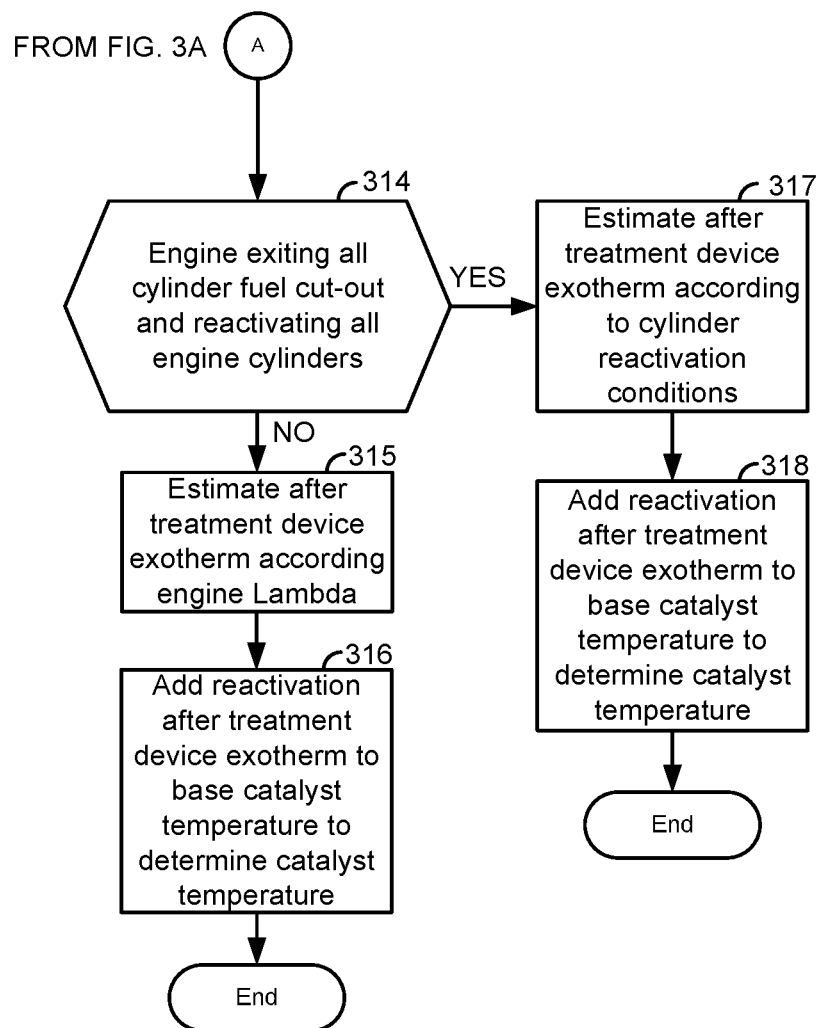
Figure 3C:
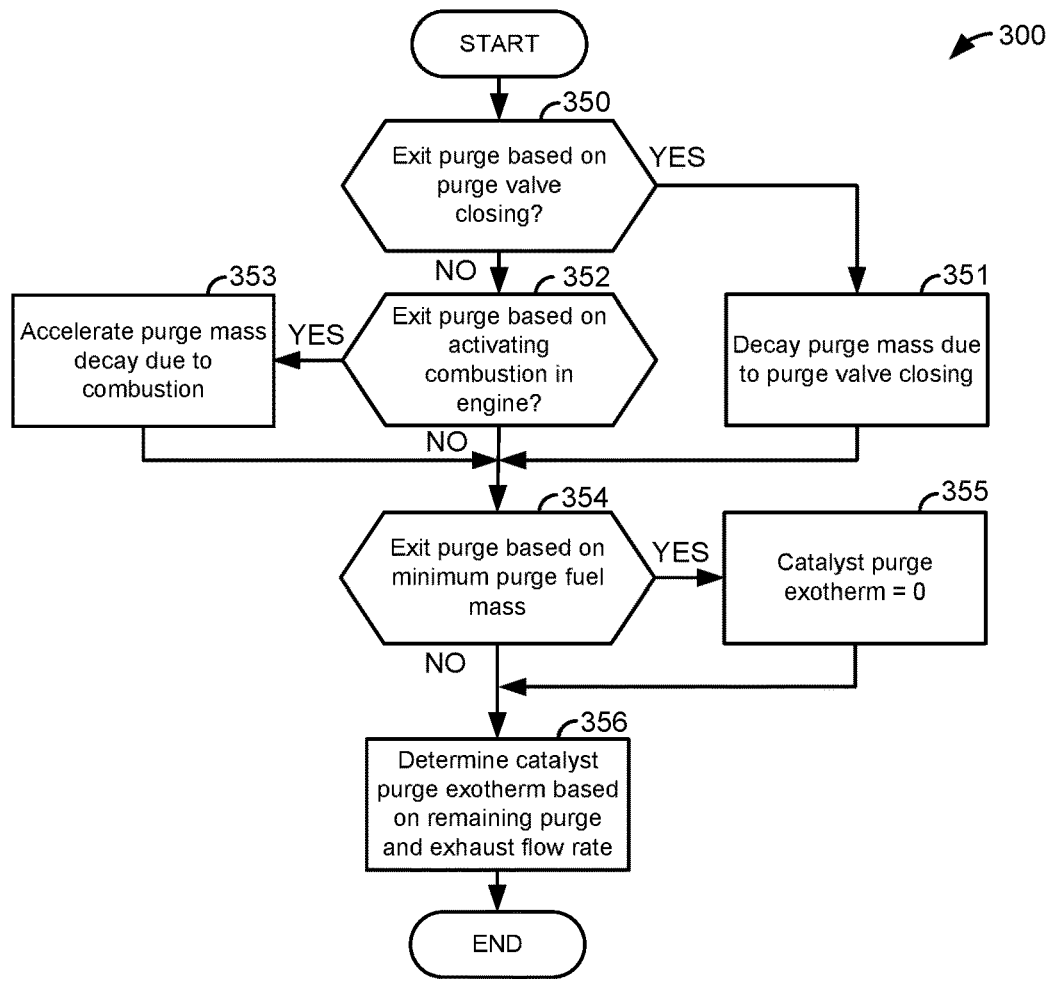
Figure 4:
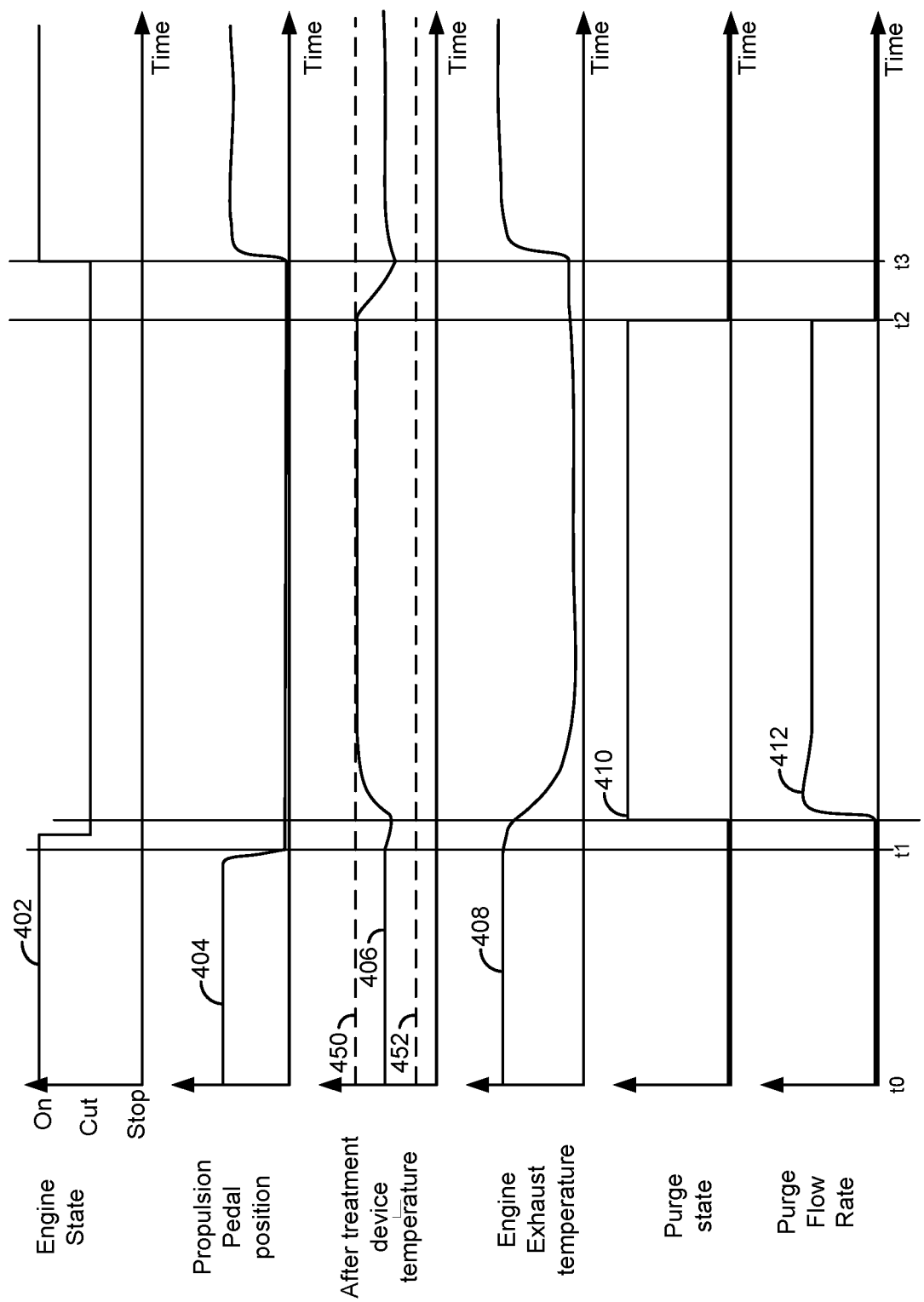
FIG. 4 shows an example engine operating sequence that includes purging fuel vapors from a fuel vapor storage canister.
Figure 5:
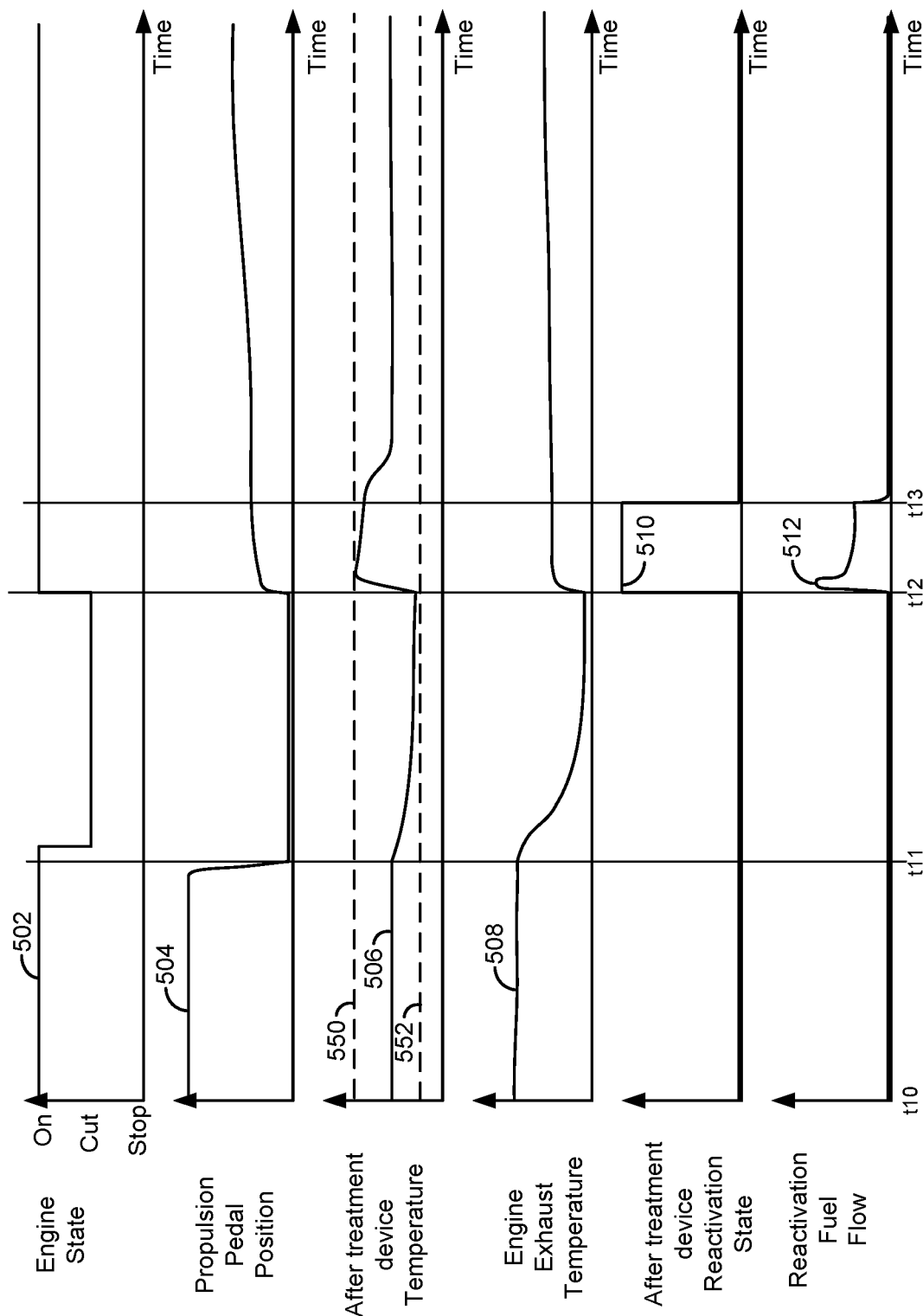
FIG. 5 shows an example engine operating sequence that includes reactivating an exhaust after treatment to improve reduction of NOx.
Figure 6:
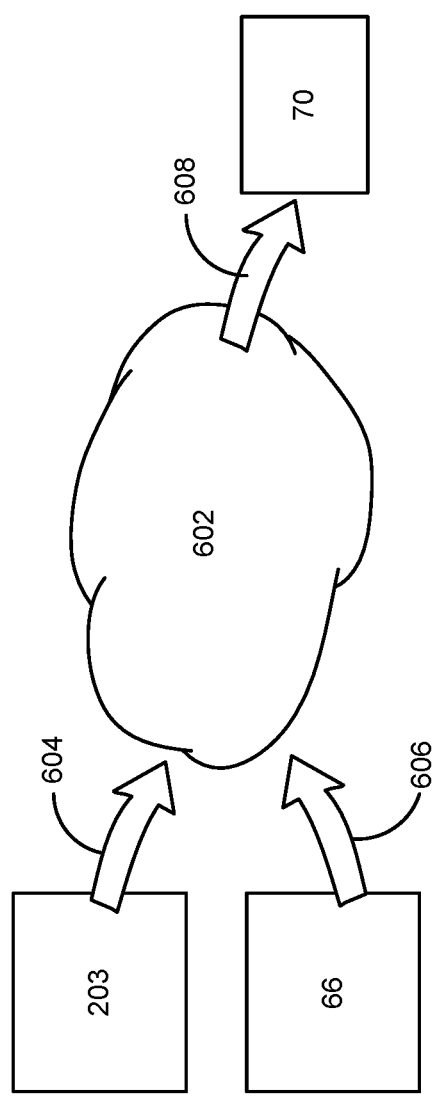
FIG. 6 shows an example fuel cloud that may develop in an exhaust system.

The present description is related to estimating a temperature of an exhaust after treatment device. The temperature of the exhaust after treatment device may be determined when purge fuel vapors are flowing to an engine operating in a fuel cut-out mode and when the after treatment device is being reactivated after exiting fuel cut-out mode. The engine may be of the type shown in FIG. 1. The engine may periodically receive fuel vapors from an evaporative emissions system as shown in FIG. 2. A method for estimating a temperature of an after treatment device and operating an engine is shown in FIGS. 3A-3C. An example engine operating sequence in which a temperature of an exhaust after treatment device is estimated while the engine operates in fuel cut-out mode is shown in FIG. 4. Another example engine operating sequence is shown in FIG. 5 where a temperature of the exhaust after treatment device is estimated while the exhaust after treatment is being reactivated. A graphic depiction of a fuel cloud within an exhaust system is shown in FIG. 6.

Figure 1:
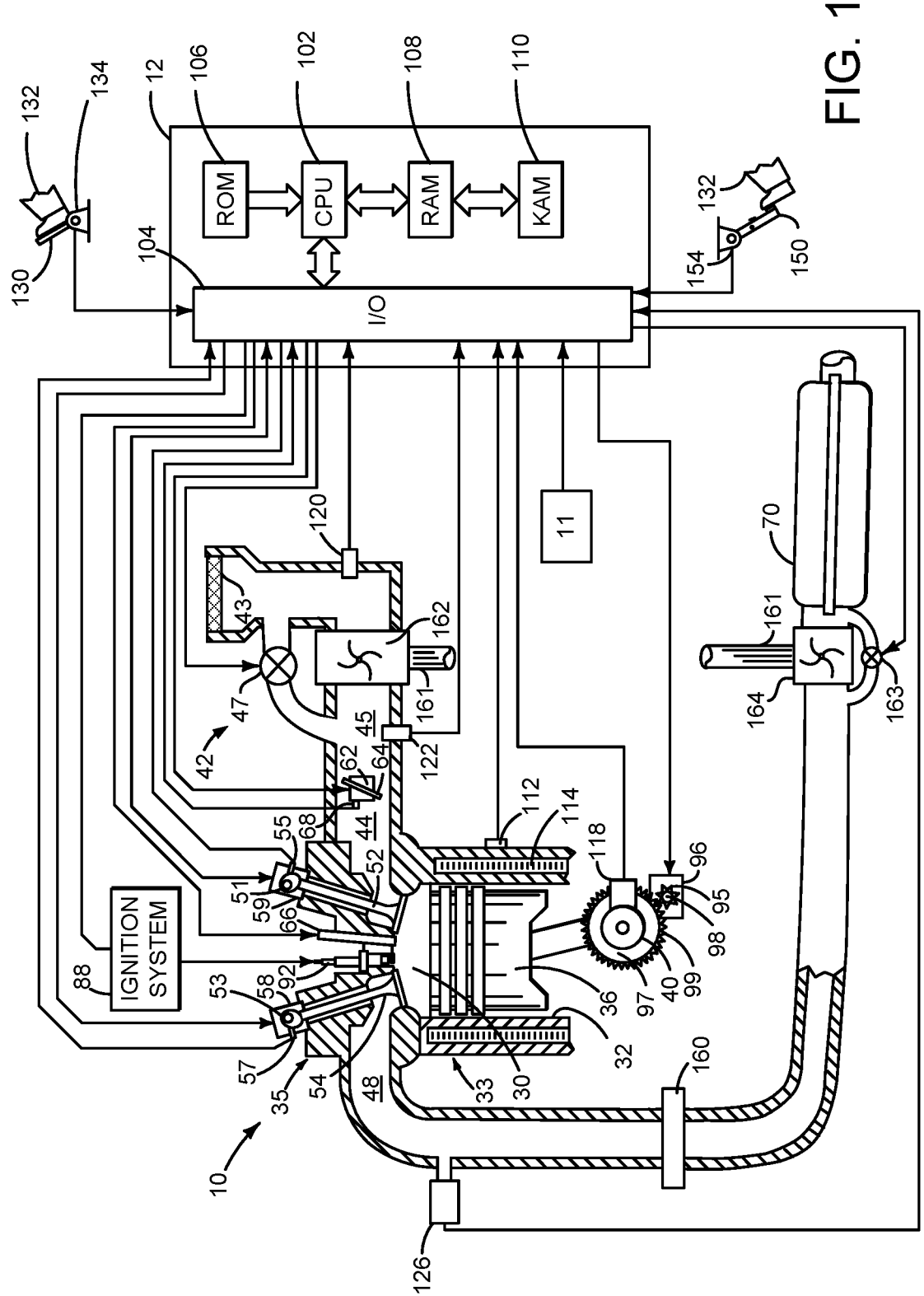
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller may employ the actuators shown in FIGS. 1 and 2 to adjust engine operation based on the received signals and instructions stored in memory of controller 12.

Engine 10 is comprised of cylinder head 35 and block 33, which include combustion chamber 30 and cylinder walls 32. Combustion chamber 30 may alternatively be referred to as a cylinder. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99 and crankshaft 40. Ring gear 99 is directly coupled to crankshaft 40. Starter 96 may be directly mounted to the front of the engine or the rear of the engine. In some examples, starter 96 may selectively supply torque to crankshaft 40 via a belt or chain. In one example, starter 96 is in a base state when it is not engaged to the engine crankshaft 40.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown protruding into combustion chamber 30 and it is positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of exhaust gas after treatment device 70. Alternatively, a two-state exhaust gas oxygen sensor may be substituted for UEGO sensor 126. Flange 160 allows exhaust manifold 48 to be coupled to exhaust gas after treatment device 70.

After treatment device 70 can include multiple catalyst bricks, in one example. In another example, multiple emission control devices, each with multiple bricks, can be used. After treatment device 70 may be a three-way type catalyst in one example. In other examples, the after treatment device may be a particulate filter or an oxidation catalyst.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an propulsion pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device. Controller 12 may also automatically start engine 10 in response to vehicle and engine operating conditions. Automatic engine starting may include starting engine 10 without input from human 132 to a device that is dedicated to receive input from human 132 for the sole purpose of starting and/or stopping rotation of engine 10 (e.g., a key switch or pushbutton). For example, engine 10 may be automatically stopped in response to driver demand torque being less than a threshold and vehicle speed being less than a threshold.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, an example fuel system 275 is shown. The fuel system of FIG. 2 may supply fuel to engine 10 shown in detail in FIG. 1. Fuel system 275 includes evaporative emission system 270. The system of FIG. 2 may be operated according to the method of FIGS. 3A-3C. Fuel system components and fluidic conduits are shown as solid lines and electrical connections are shown as dashed lines. The conduits represented by solid lines provide fluidic communication between devices linked by the conduits. Further, the conduits are coupled to the devices from which and to which they lead.

Evaporative emissions system 270 includes a fuel vapor storage canister 202 for storing fuel vapors. Evaporative emissions system 270 also includes carbon 203 for storing and releasing fuel vapors. Fuel vapor storage canister 202 is shown including atmospheric vent line 205 along which normally closed canister vent valve (CVV) 213 is placed to selectively allow air to flow into and out of fuel vapor storage canister 202. Fuel vapors may be supplied to fuel vapor storage canister 202 via conduit 208 and normally open fuel vapor blocking valve (VBV) 219. Fuel vapors may be purged via canister purge valve (CPV) 204 which allows fluidic communication between fuel vapor storage canister 202 and engine intake manifold 44 or intake 42 via conduit 207.

Engine 10 includes a fuel rail 220 that supplies fuel to direct fuel injector 66. Fuel vapors may be inducted into intake manifold 44 or intake 42 when intake manifold pressure is below atmospheric pressure. Fuel 231 is supplied from fuel tank 230 by fuel pump 252 to fuel rail 220. Pressure in fuel tank 232 may be measured via fuel tank pressure transducer (FTPT) 241 and relayed to controller 12. Controller 12 may receive inputs from the sensors described in FIG. 1 as well as sensor 241. Controller 12 also activates and deactivates CPV 204, CVV 213, VBV 219, and pump 252 in response to fuel system and engine operating conditions.

In one example, the system of FIG. 2 operates according to the method of FIGS. 3A-3C via executable instructions stored in non-transitory memory of controller 12. While engine 10 is operating, fuel vapors from fuel tank 230 may be stored in fuel vapor storage canister 202 in response to temperatures in fuel tank 230 increasing.

Fuel vapors from fuel tank 230 may push air out of normally open CVV 213 when temperature and/or pressure in fuel tank 230 is increasing. If engine 10 is operating while vapors are being directed to fuel vapor storage canister 202, CPV 204 may be opened so that fuel vapors are drawn into and combusted in engine 10. If engine 10 is not operating or if CPV 204 is closed, fuel vapor may flow into fuel vapor storage canister 202 if temperature and/or pressure in fuel tank 230 increases such that fuel vapors flow to and are stored in fuel vapor storage canister 202.

On the other hand, if engine 10 is not operating or if CPV 204 is closed while temperature and/or pressure in fuel tank 230 is decreasing, fuel vapors from fuel vapor canister 202 may condense in fuel tanks 230 when VBV 219 is open. VBV 219 may be a normally open valve that is closed when CPV is open to improve vacuum formation in canister 202, thereby improving evacuation of fuel vapors from fuel vapor storage canister 202. Thus, the fuel system shown in FIG. 2 provides a way of decreasing a volume of the fuel vapor emissions system that is purged so that fuel vapor canister purging may be improved.

Thus, the system of FIGS. 1 and 2 provides for a system, comprising: an engine including a plurality of cylinders having a plurality of fuel injectors and an after treatment device; a canister including stored fuel vapors; a purge control valve in fluidic communication with the canister; and a controller including executable instructions stored in non-transitory memory that cause the controller to adjust a position of the purge control valve in response to an estimate of a temperature of the after treatment device while fuel vapors flow from the purge control valve to the after treatment device and while the engine is operating in a fuel cut-out mode where fuel is not injected to engine cylinders via the plurality of fuel injectors. The system includes wherein the fuel vapors flow from the purge control valve to the after treatment device via at least partially opening the purge control valve. The system includes where the estimate of the temperature of the after treatment device is based on a fuel cloud. The system includes where opening the purge control valve supplies fuel to the fuel cloud. The system includes where adjusting the position of the purge control valve includes closing the purge control valve in response to the estimate of the temperature being greater than a threshold temperature. The system further comprises additional instructions to estimate an amount of fuel being combusted via the after treatment device. The system further comprises additional instructions to adjust an exotherm temperature in response to exiting a fuel vapor canister purge mode.

Referring now to FIGS. 3A-3C, a flow chart of a method for estimating a temperature of an after treatment device and operating an engine is shown. The method of FIGS. 3A-3C may be incorporated into and may cooperate with the system of FIGS. 1 and 2. Further, at least portions of the method of FIGS. 3A-3C may be incorporated as executable instructions stored in non-transitory memory while other portions of the method may be performed via a controller transforming operating states of devices and actuators in the physical world.

At 302, method 300 determines operation conditions. Operating conditions may include but are not limited to ambient temperature, engine temperature, engine speed, barometric pressure, engine air flow, engine load, spark timing, and driver demand torque. Method 300 proceeds to 304.

At 304, method 300 estimates exhaust gas temperature and flow rate. In one example, method 300 may determine exhaust gas temperature and flow rate via the following equations:

$$\text{Exh\_Engine}_{out}=f1(N,AM,\textit{Spk\_del},EGR,ECT,LAM)$$

$$\text{Exh\_flow}=AM+FM$$

where $\text{Exh\_Engine}_{out}$ is the estimated exhaust gas temperature leaving the exhaust manifold (flange), f1 is a function that returns the estimated exhaust gas temperature at the flange, N is engine speed, AM is air mass flow through the engine, Spk_del is spark timing difference from minimum spark for best engine torque, EGR is the exhaust gas recirculation amount, ECT is engine temperature, and LAM is the engine air-fuel ratio divided by the stoichiometric air-fuel ratio, Exh_flow is the exhaust flow rate, FM is the fuel mass flow rate. Method 300 proceeds to 306.

At 306, method 300 estimates an exhaust after treatment device inlet temperature. In one example, method 300 determines exhaust temperature at the inlet of the exhaust after treatment device via the following equation:

$$\text{Exh\_ATDevice}_{inlet} = \text{Exh\_temp} - \text{Exh\_Loss}$$

where $\text{Exh\_ATDevice}_{inlet}$ is exhaust temperature at the exhaust after treatment device inlet, Exh_temp is exhaust temperature at the exhaust flange, and Exh_Loss is a temperature drop. Exh_Loss may be determined as a function of engine air flow rate and a table of empirically determined values generated while driving a vehicle and measuring exhaust temperature drop. Method 300 determines the exhaust after treatment device inlet temperature and proceeds to 308.

At 308, method 300 judges if the engine is operating with a stoichiometric air-fuel ratio and an exhaust after treatment temperature is greater than a threshold temperature. Method 300 may determine if the engine is operating with a stoichiometric air-fuel ratio based on output of an exhaust gas oxygen sensor. Method may judge if the exhaust after treatment temperature is greater than at threshold based on a present exhaust after treatment temperature estimate. If method 300 judges that the engine is operating with a stoichiometric air-fuel ratio and with exhaust after treatment temperature greater than a threshold temperature, the answer is yes and method 300 proceeds to 320. Otherwise, the answer is no and method 300 proceeds to 310.

At 320, method 300 estimates a after treatment device exotherm temperature based on stoichiometric operating conditions. Method 300 estimates an after treatment device exotherm temperature according to the following equation:

$$\text{ATExotherm}_{stoich} = f2(AM)$$

where $\text{ATExotherm}_{stoich}$ is a variable that represents the after treatment device exotherm temperature during stoichiometric engine operating conditions, f2 is a function that returns empirically determined after treatment device exotherm valves as a function of engine air mass (AM) for when the engine is operating with a stoichiometric air-fuel ratio. Values in function f2 may be determined via driving a vehicle while the vehicle's engine operates with a stoichiometric air-fuel ratio and recording after treatment device temperature as a function of engine air mass. Method 300 proceeds to 322 after determining the after treatment device exotherm temperature.

At 322, method 300 estimates the after treatment device temperature. Method 300 may determine a feed-forward steady state after treatment device temperature according to the following equation:

$$\text{Exh\_ATDevice}_{SteadyState} = \text{Exh\_ATDevice}_{inlet} + \text{ATExotherm}_{stoich}$$

where $\text{Exh\_ATDevice}_{SteadyState}$ is the steady state after treatment device temperature, $\text{ATExotherm}_{stoich}$ is the after treatment device exotherm for stoichiometric engine operation, and $\text{Exh\_ATDevice}_{inlet}$ is the temperature at the after treatment device inlet. The final after treatment device temperature may be determined via the following equation:

$$\text{Exh\_ATDevice}_{Midbed} = (1-FK)\text{Exh\_ATDevice}_{inlet} + FK(\text{Exh\_ATDevice}_{SteadyState})$$

where $\text{Exh\_ATDevice}_{Midbed}$ is the after treatment device mid-bed temperature, FK is a low pass filter constant, and $\text{Exh\_ATDevice}_{SteadyState}$ is the steady state after treatment device temperature. Method 300 proceeds to exit.

In some examples, actuators of the engine may be adjusted in response to the after treatment device mid-bed temperature. For example, if mid-bed temperature exceeds a threshold temperature, then method 300 may richen the engine air-fuel ratio to reduce the exotherm. In addition, method 300 may adjust spark timing to reduce the exotherm. For example, method 300 may advance spark timing to reduce exhaust gas temperatures in an effort to reduce the exotherm.

At 310, method 300 judges if the engine is operating with fuel vapor canister purge activated during fuel cut-out conditions. Fuel vapor canister purge may be activate via opening the canister purge valve to allow fuel vapors to exit the fuel vapor storage canister and enter the engine intake manifold. The fuel vapors may be pumped from the intake manifold to an after treatment device via the engine as the engine rotates. Canister purge may be activated in response to an estimate of an amount of fuel vapors that are stored in the fuel vapor storage canister (e.g., 203 if FIG. 2). The engine may be operated in a fuel cut-out mode in response to vehicle speed and driver demand torque. In particular, when vehicle speed is greater than a threshold speed and driver demand torque is less than a threshold torque, the engine may enter fuel cut-out mode where fuel is not injected into the engine via fuel injectors to conserve fuel. In addition, the engine continues to rotate without being fueled via the fuel injectors while in fuel cut-out mode. If method 300 judges that engine is operating in fuel cut-out mode with canister purge activated, the answer is yes and method 300 proceeds to 330. Otherwise, method 300 proceeds to 312.

At 330, method 300 estimates an after treatment device exotherm for when the engine is operating in a fuel cut-out mode with purge activated. Method 300 may determine the after treatment device exotherm according to an estimate of purge fuel flowing through the engine and to the after treatment device. In one example, method 300 may determine the purge fuel flow according to the following equation:

$$\text{Flow}_{Purge} = \text{HC\_con} * f3(dty, MAP, T\_HC, BP)$$

where $\text{Flow}_{Purge}$ is the fuel mass flow rate, HC_con is a hydrocarbon concentration in purge vapor flowing to the engine, which may be determined via a HC sensor, f3 is a function that determines a mass flow rate of purge fuel vapors, dty is a purge valve duty cycle, MAP is intake manifold pressure, BP is barometric pressure, and T_HC is the temperature of fuel vapors. For purge vapor, the mass of fuel entering and leaving the fuel cloud are identical, everything that enters will be combusted causing an exotherm. A rolling average purge flow rate is calculated to avoid rapid changes in exotherm.

$$\text{Flow}_{PurgeAve} = \Sigma \text{Flow}_{Purge} / \Sigma \text{Time}$$

$$\text{ATExotherm}_{Purge} = f3(AM) * \text{Flow}_{PurgeAve}$$

where $\text{ATExotherm}_{Purge}$ is the after treatment device exotherm due to purge when in fuel cut and β3 is a function that returns empirically determined after treatment device exotherm per unit of purge flow as a function of engine air mass (AM) for when purge is introduced in fuel cut conditions.

At 332, method 300 estimates the after treatment device temperature including the exotherm according to purge conditions. Method 300 may determine a steady state after treatment device temperature according to the following equation:

$$\text{Exh\_ATDevice}_{Midbed} = \text{Exh\_ATDevice}_{Midbed} + \text{ATExotherm}_{Purge}$$

where $\text{Exh\_ATDevice}_{Midbed}$ is the after treatment device mid-bed temperature, $\text{ATExotherm}_{Purge}$ is the after treatment device exotherm due to purge when in fuel cut, Method 300 proceeds to exit.

In some examples, actuators of the engine may be adjusted in response to the after treatment device mid-bed temperature. For example, if mid-bed temperature exceeds a threshold temperature, then method 300 may reduce a duty cycle or valve opening amount of the canister purge valve to regulate the exotherm. In some examples, method 300 may also adjust air flow through the throttle to reduce the exotherm.

At 312, method 300 judges if the engine has recently exited fuel vapor canister purge (e.g., if the engine has exited fuel vapor canister purge within a predetermined amount of time). Method 300 may judge that the engine has exited fuel vapor canister purge if the canister purge valve has closed. If method 300 judges that the engine has recently exited the fuel vapor canister purge while operating in fuel cut-out mode, method 300 proceeds to 340.

At 340, method 300 adjusts the after treatment device exotherm according to fuel vapor canister purge exit conditions as described in FIG. 3C. Method 300 proceeds to exit.

In some examples, actuators of the engine may be adjusted at 340 in response to the after treatment device mid-bed temperature. For example, if mid-bed temperature exceeds a threshold temperature, then method 300 may reduce a fuel injection timing to reduce fuel delivered to reactivate the after treatment device.

At 314, method 300 judges if the engine has recently exited all cylinder fuel cut-out mode and started reactivating one or more after treatment devices. All cylinder cut-out includes ceasing to supply fuel to all engine cylinders (e.g., fuel flow is ceased to eight cylinders of an engine that includes an actual total of eight cylinders) while the engine continues to rotate via energy provided by the vehicle's wheels. Method 300 may judge that the engine has exited all cylinder cut-out mode when the engine begins operating all of the engine's fuel injectors after all of the engine's fuel injectors have ceased injecting fuel. The after treatment device may have become saturated with oxygen while the engine operated in fuel cut-out mode and the engine pumped fresh air to the after treatment device as the engine is rotated. Once the after treatment device becomes saturated with oxygen, it may be less efficient at reducing NOx. However, the after treatment device may be reactivated such that it begins to reduce NOx efficiently if the engine begins combusting a rich air-fuel mixture or via injecting fuel such that hydrocarbons that have not combusted reach the after treatment device. If method 300 judges that the engine has recently exited all cylinder fuel cut-out mode and started to reactivate one or more after treatment devices, the answer is yes and method 300 proceeds to 317. Otherwise, the answer is no and method 300 proceeds to 315.

At 315, method 300 estimates an after treatment device exotherm temperature based on engine Lambda operating conditions. Method 300 estimates an after treatment device exotherm temperature according to the following equation:

$$ATExoMult_{Lambda}=f4(AM,Lambda)$$

where $ATExoMult_{Lambda}$ is a variable that represents the after treatment device exotherm temperature multiplier during other than stoichiometric engine operating conditions, f4 is a function that returns empirically determined after treatment device exotherm valves as a function of engine air mass (AM) and Lambda (e.g., engine air-fuel ratio/stoichiometric air-fuel ratio) for when the engine is not operating with a stoichiometric air-fuel ratio. Values in function f4 may be determined via driving a vehicle while the vehicle's engine operates with other than a stoichiometric air-fuel ratio and recording after treatment device temperature as a function of engine air mass and Lambda. Method 300 proceeds to 316 after determining the after treatment device exotherm temperature.

At 316, method 300 estimates the after treatment device temperature. Method 300 may determine a steady state after treatment device temperature according to the following equation:

$$Exh\_ATDevice_{SteadyState}=Exh\_ATDevice_{inlet}+ \\ (ATExotherm_{stoich}*ATExoMult_{Lambda})$$

where $Exh\_ATDevice_{SteadyState}$ is the steady state after treatment device temperature, $ATExoMult_{Lambda}$ is the after treatment device exotherm multiplier for other than stoichiometric engine operation, and $Exh\_ATDevice_{inlet}$ is the temperature at the after treatment device inlet. The final after treatment device temperature may be determined via the following equation:

$$Exh\_ATDevice_{Midbed}=(1-FK)Exh\_ATDevice_{Midbed}+ \\ FK(Exh\_ATDevice_{SteadyState})$$

where $Exh\_ATDevice_{Midbed}$ is the after treatment device mid-bed temperature, FK is a low pass filter constant, and $Exh\_ATDevice_{SteadyState}$ is the steady state after treatment device temperature. Method 300 proceeds to exit.

At 317, method 300 estimates an after treatment device exotherm based on fuel supplied to the exhaust gases that is applied to reactivate the after treatment device. In one example, method 300 may determine the after treatment device reactivation fuel flow according to the following equation:

$$mf\_acum=mf\_acum_{previous}+mf\_react_{added}+mf\_react_{exo}$$

where mf_acum is the fuel mass supplied to reactivate the exhaust after treatment device, $mf\_acum_{previous}$ is the amount of unburned fuel remaining in the exhaust from the last calculation event, and $mf\_react_{added}$ is the amount of fuel added for reactivation during this calculation event, $mf\_react_{exo}$ is the amount of fuel expected to combust and create exotherm during this calculation event. The mass of fuel leaving a fuel cloud in the exhaust system may be determined via the following equation:

$$mf\_react_{exo}=mf\_acum*mf\_exo\_mul(AM)$$

where $mf\_react_{exo}$ is the fuel leaving the fuel cloud within the exhaust system, mf_acum is the total fuel amount in the fuel cloud within the exhaust system, mf_exo_mul(AM) is the fraction of fuel leaving the fuel cloud within the exhaust systems a function of air mass flow rate through the engine. In one example, the variable mf_exo_mul(AM) may be stored in memory as a 2×4 matrix and values in the matrix may be empirically determined or modeled. The fraction of fuel leaving the fuel cloud in the exhaust system and being combusted in the exhaust after treatment device may be determined via the following equation:

$$mf\_comb=mf\_react_{exo}-mf\_temp\_mul(Exh\_ \\ ATDevice_{Midbed})\cdot mf\_O2\_mul(O2conc)$$

where mf_comb is the mass of fuel leaving the fuel cloud in the exhaust system and being combusted in the exhaust after treatment device, $mf\_react_{exo}$ is the mass of fuel that is leaving the fuel cloud in the exhaust system, mf_temp_mul ($Exh\_ATDevice_{Midbed}$) is the fraction of fuel combusted as a function of after treatment device mid-bed temperature $Exh\_ATDevice_{Midbed}$, mf_O2_mul(O2conc) return a multiplier to the fuel mass as a function of the amount of oxygen stored in the exhaust after treatment device during fuel cut-out (O2conc). The parameter mf_temp_mul(Exh_AT- Device$_{Midbed}$) may be determined empirically by comparing the exotherm generated at consistent after treatment oxygen saturation with varying after treatment device temperatures. The parameter mf_O2_mul(O2conc) may be determined empirically by comparing the exotherm generated at consistent after treatment device temperatures with varying oxygen saturation. The parameter O2$_{stored}$ may be calculated by determining the oxygen flow rate due to partial or non-firing cylinders until the after treatment device is saturated. The after treatment device exotherm for when the engine is operating in a fuel cut-out mode with purge activated may be determined via the following equation:

$$ATExotherm_{React}=mf\_exo\_mul*mf\_comb$$

where ATExotherm$_{React}$ is the after treatment device exotherm for after treatment device reactivation for the present iteration, mf_exo_mul is the expected after treatment device exotherm temperature rise per unit of fuel available for combustion and mf_comb is as previously described. Method 300 also enters after treatment reactivation mode via increasing fuel injected and fuel delivered to the after treatment device. Fuel for reactivating the after treatment device may be injected during an intake or exhaust stroke of the engine. Method 300 proceeds to 318.

At 318, method 300 estimates the after treatment device temperature including the exotherm according to after treatment reactivation conditions. The final after treatment device temperature may be determined via the following equation:

$$Exh\_ATDevice_{Midbed}=Exh\_ATDevice_{Midbed}+ATExotherm_{React}$$

where Exh_ATDevice$_{Midbed}$ is the after treatment device mid-bed temperature, ATExotherm$_{React}$ is the exotherm that can be attributed to reactivation of the after treatment device. Method 300 proceeds to exit.

Referring now to FIG. 3C, a method for adjusting the exhaust after treatment device exotherm after exiting fuel vapor canister purge during fuel cut-out mode is shown. The method of FIG. 3C may operate in conjunction with the method of FIGS. 3A and 3B and the system shown in FIGS. 1 and 2.

At 350, method 300 judges if fuel vapor canister purge mode has been exited based on or due to closing of the canister purge valve. The canister purge valve may be closed when it is determined that less than a threshold amount of fuel vapors are being purged from the fuel vapor storage canister. If method 300 judges that the fuel vapor canister purge mode has been exited based on closing of the canister purge valve, the answer is yes and method 300 proceeds to 351. Otherwise, method 300 proceeds to 352.

At 351, method 300 reduces the exhaust after treatment device exotherm based on exiting the fuel vapor canister purge mode in response to the purge valve closing while remaining in fuel cutoff. In one example, method 300 may reduce the exhaust after treatment device exotherm at a first predetermined rate. For example, the variable ATExotherm$_{Purge}$ may be revised each time method 300 is executed as prescribed in the following equation:

$$ATExotherm_{Purge}=f3(AM)*(Flow_{PurgeComb}*decay\_rate)$$

where ATExotherm$_{Purge}$ is the present value of the after treatment device exotherm for operating the fuel cut-out mode with purge activated, $f3$ is a function that returns empirically determined after treatment device exotherm per unit of purge flow as a function of engine air mass (AM) for when purge is introduced in fuel cut conditions (as outlined previously), Flow$_{PurgeComb}$ is the purge remaining in the exhaust flow and decay_rate is the desired decay rate of remaining purge in the exhaust stream, Flow$_{PurgeComb}$ until all remaining purge has been combusted.

Method 300 also revises the exhaust after treatment device temperature based on the revised value of Exh_ATDevice$_{Midbed}$. In particular, method 300 determines the steady state after treatment device temperature according to the following equation:

$$Exh\_ATDevice_{Midbed}=Exh\_ATDevice_{Midbed}+ATExotherm_{Purge}$$

where Exh_ATDevice$_{Midbed}$ is the after treatment device mid-bed temperature, ATExotherm$_{Purge}$, is the after treatment device exotherm due to purge when in fuel cut. Method 300 proceeds to exit.

At 352, method 300 judges if fuel vapor canister purge mode has been exited based on activating combustion in engine cylinders. The canister purge mode may be exited in response to an increase in driver demand torque that causes cylinders to be reactivated. If method 300 judges that the fuel vapor canister purge mode has been exited based on activating combustion in engine cylinders, the answer is yes and method 300 proceeds to 353. Otherwise, method 300 proceeds to 354.

At 353, method 300 reduces the exhaust after treatment device exotherm based on exiting the fuel vapor canister purge mode in response to cylinders being reactivated. In one example, method 300 may reduce the remaining combustible purge due to the cylinder re-enablement and reduction in exhaust oxygen concentration. For example, Flow$_{PurgeComb}$, may be revised one time as outlined in the following equation:

$$Flow_{PurgeComb}=(Flow_{PurgeComb}*Offset_{Comb})$$

where Flow$_{PurgeComb}$, is the purge remaining in the exhaust flow and Offset$_{Comb}$ is offset multiplier to account for the decrease in purge combustion due to cylinder reactivation and reduction in exhaust oxygen concentration. Further, method 300 reduces the exhaust after treatment device exotherm based on exiting the fuel vapor canister purge mode in response to cylinder re-enablement. For example, the variable ATExotherm$_{Purge}$ may be revised each time method 300 is executed as prescribed in the following equation:

$$ATExotherm_{Purge}=f3(AM)*(Flow_{PurgeComb}*decay\_rate*decay\_mult)$$

where ATExotherm$_{Purge}$ is the present value of the after treatment device exotherm for operating the fuel cut-out mode with purge activated, $f3$ is a function that returns empirically determined after treatment device exotherm per unit of purge flow as a function of engine air mass (AM) for when purge is introduced in fuel cut conditions (as outlined previously), Flow$_{PurgeComb}$ is the purge remaining in the exhaust flow, decay_rate is the desired decay rate of remaining purge in the exhaust stream and decay_mult is a decay rate multiplier to increase the decay rate due to active combustion.

Method 300 also revises the exhaust after treatment device temperature based on the revised value of Exh_ATDevice$_{Midbed}$ In particular, method 300 determines the steady state after treatment device temperature according to the following equation:

$$Exh\_ATDevice_{Midbed}=Exh\_ATDevice_{Midbed}+ATExotherm_{Purge}$$

where $\text{Exh\_ATDevice}_{Midbed}$ is the after treatment device mid-bed temperature, $\text{ATExotherm}_{Purge}$ is the after treatment device exotherm due to purge when in fuel cut. Method 300 proceeds to exit.

At 354, method 300 judges if fuel vapor canister purge mode has been exited based on a reduction in hydrocarbon flow from the fuel vapor storage canister to the engine and exhaust after treatment device. The hydrocarbon flow rate may be reduced as the fuel vapor storage canister is purged of fuel vapors. If method 300 judges that the fuel vapor canister purge mode has been exited based on a reduction in hydrocarbon flow, the answer is yes and method 300 proceeds to 355. Otherwise, method 300 proceeds to 356.

At 355, method 300 reduces the exhaust after treatment device exotherm to zero because any remaining purge mass in the exhaust is not large enough to create a exotherm in the after treatment device.

Method 300 also revises the exhaust after treatment device temperature based on the revised value of $\text{Exh\_ATDevice}_{Midbed}$. In particular, method 300 determines the after treatment device temperature according to the following equation:

$$\text{Exh\_ATDevice}_{Midbed} = \text{Exh\_ATDevice}_{Midbed} + \text{ATExotherm}_{Purge}$$

where $\text{Exh\_ATDevice}_{Midbed}$ is the after treatment device mid-bed temperature, $\text{ATExotherm}_{Purge}$, is zero. Method 300 proceeds to exit.

Thus, the method of FIGS. 3A-3C provides for an engine operating method, comprising: operating an engine in a fuel cut-out mode wherein the engine rotates without injecting fuel to the engine via fuel injectors; delivering fuel to the engine via a fuel vapor canister while operating the engine in the fuel cut-out mode; and estimating a temperature of an exhaust after treatment device via a controller, the controller estimating the temperature of the exhaust after treatment device based on combusting fuel supplied from the fuel vapor canister in the exhaust after treatment device while operating the engine in the fuel cut-out mode. The method further comprises adjusting an actuator in response to the estimated temperature. The method includes where the actuator is a purge control valve. The method further comprises decreasing an opening amount of the purge control valve in response to the estimate of the temperature of the exhaust after treatment device exceeding a threshold temperature. The method includes where estimating the temperature of the exhaust after treatment device includes estimating an amount of fuel combusting after leaving a fuel cloud. The method includes where the fuel cloud includes fuel supplied from the fuel vapor canister. The method further comprises estimating an amount of fuel stored in the fuel cloud.

The method of FIGS. 3A-3C also provides for an engine operating method, comprising: operating an engine in a fuel cut-out mode via a controller wherein the engine rotates without injecting fuel to the engine via fuel injectors; delivering fuel to the engine via a fuel vapor canister while operating the engine in the fuel cut-out mode; estimating an amount of fuel being delivered to the engine via the fuel vapor canister; estimating an amount of fuel stored in a fuel cloud, the fuel cloud containing fuel from the fuel vapor canister; estimating an amount of fuel exiting the fuel cloud and combusting in an exhaust after treatment device; and estimating a temperature of the exhaust after treatment device via the controller, the controller estimating the temperature of the exhaust after treatment device based on the estimate of fuel amount of fuel exiting the fuel cloud. The method further comprises adjusting an actuator in response to the estimated temperature. The method includes where the actuator is a purge control valve. The method includes where the actuator is a throttle. The method further comprises estimating an amount of fuel stored in the fuel cloud. The method further comprises closing the purge valve in response to the estimate of the amount of fuel being delivered to the engine via the fuel vapor canister.

Referring now to FIG. 4, an example fuel vapor storage canister purging event during an engine fuel cut-out mode is shown. The sequence of FIG. 4 may be generated via the system of FIGS. 1 and 2 in cooperation with the method of FIGS. 3A-3C. Vertical lines at times t0-t3 represent times of interest during the sequence. The plots in FIG. 4 are time aligned and occur at the same time.

The first plot from the top of FIG. 4 is a plot of engine operating state versus time. The vertical axis represents engine operating state and the engine is requested to be on or run (e.g., rotate and combust fuel and air) when trace 402 is at a higher level near the vertical axis arrow. The engine is requested to be in or is in fuel cut-out mode (e.g., the engine is rotating without delivering fuel to the engine's cylinders) when trace 402 is at the level cut indicated along the vertical axis. The engine is requested to stop or is stopped (e.g., not rotating and combusting air and fuel) when trace 402 is at a lower level near the horizontal axis. The horizontal axis represents time and time increases from the left side of the plot to the right side of the plot. Trace 402 represents the engine operating state.

The second plot from the top of FIG. 4 is a plot of propulsion pedal position versus time. The vertical axis represents propulsion pedal position and the propulsion pedal is applied further in the direction of the vertical axis arrow. The horizontal axis represents time and time increases from the left side of the plot to the right side of the plot. Trace 404 represents the propulsion pedal position.

The third plot from the top of FIG. 4 is a plot of an estimated after treatment device temperature versus time. The vertical axis represents the estimated after treatment device temperature and estimated after treatment device temperature increases in the direction of the vertical axis arrow. The horizontal axis represents time and time increases from the left side of the plot to the right side of the plot. Trace 406 represents the after treatment device temperature. Horizontal line 450 represents an upper threshold or limit not to be exceeded and horizontal line 452 represents an after treatment light off temperature.

The fourth plot from the top of FIG. 4 is a plot of engine exhaust gas temperature versus time. The vertical axis represents engine exhaust gas temperature at the exhaust flange upstream of the engine exhaust after treatment device. The horizontal axis represents time and time increases from the left side of the plot to the right side of the plot. Trace 408 represents the engine exhaust gas temperature.

The fifth plot from the top of FIG. 4 is a plot of a fuel vapor canister purge state versus time. The vertical axis represents fuel vapor purge state and fuel vapor purge is activated (e.g., flowing fuel vapors from the fuel vapor canister to the engine) when trace 410 is at a higher level near the vertical axis arrow. Fuel vapor canister purge is not activated when trace 410 is at a lower level near the horizontal axis. The horizontal axis represents time and time increases from the left side of the plot to the right side of the plot. Trace 410 represents the fuel vapor canister purge state.

The sixth plot from the top of FIG. 4 is a plot of fuel vapor purge flow rate versus time. The vertical axis represents fuel vapor purge flow rate and the fuel vapor flow rate increases in the direction of the vertical axis arrow. The horizontal axis represents time and time increases from the left side of the plot to the right side of the plot. Trace 412 represents the fuel vapor purge flow rate.

At time t0, the engine state is running (e.g., rotating and combusting fuel). The propulsion pedal is applied and the estimated after treatment device temperature is above level 452 and below level 450. The engine exhaust temperature is at a higher level and fuel vapor canister purge is not activated. The purge flow rate is zero.

At time t1, the propulsion pedal is fully released while the engine is running. The catalyst temperature and other variables are at their previous levels. Shortly after time t1, the engine enters fuel cut-out mode and the estimated after treatment device temperature begins to cool as the engine pumps a small amount of air to the after treatment device. Fuel vapor canister purge begins shortly after the engine enters fuel cut-out mode and the fuel vapor canister purge flow rate is increased. The estimated after treatment device temperature begins increasing as fuel vapors are oxidized within the engine after treatment device. The purge flow rate is reduced via partially closing the purge valve (not shown) as the estimated after treatment device temperature approaches threshold 450. Thus, the estimated after treatment device temperature and the actual after treatment device temperature may be regulated via adjusting the position or duty cycle of the purge valve.

At time t2, the fuel vapor canister purge mode is exited. The fuel vapor canister purge mode may be exited based on duration of purging, a reduction in purge vapors, or other operating conditions. The purge flow rate is reduced to zero via closing the purge valve and the engine remains in fuel cut-out mode. The propulsion pedal is not applied and the engine exhaust temperature is low. The estimated after treatment device temperature begins to be reduced.

At time t3, the propulsion pedal is applied and the engine is reactivated in response to an increase in driver demand torque as determined from propulsion pedal position. The estimated after treatment device temperature begins to increase and the engine exhaust temperature increases. The fuel canister purge remains deactivated and the purge flow rate remains at zero.

In this way, temperature of an after treatment device may be estimated and controlled during engine fuel cut-out mode. In particular, the after treatment device temperature may be regulated via adjusting a position of a purge valve.

Referring now to FIG. 5, an example reactivation event of an engine exhaust gas after treatment device after exiting an engine fuel cut-out mode is shown. The sequence of FIG. 5 may be generated via the system of FIGS. 1 and 2 in cooperation with the method of FIGS. 3A-3C. Vertical lines at times t10-t13 represent times of interest during the sequence. The plots in FIG. 4 are time aligned and occur at the same time.

The first plot from the top of FIG. 5 is a plot of engine operating state versus time. The vertical axis represents engine operating state and the engine is requested to be on or run (e.g., rotate and combust fuel and air) when trace 502 is at a higher level near the vertical axis arrow. The engine is requested to be in or is in fuel cut-out mode (e.g., the engine is rotating without delivering fuel to the engine's cylinders) when trace 502 is at the level cut indicated along the vertical axis. The engine is requested to stop or is stopped (e.g., not rotating and combusting air and fuel) when trace 502 is at a lower level near the horizontal axis. The horizontal axis represents time and time increases from the left side of the plot to the right side of the plot. Trace 502 represents the engine operating state.

The second plot from the top of FIG. 5 is a plot of propulsion pedal position versus time. The vertical axis represents propulsion pedal position and the propulsion pedal is applied further in the direction of the vertical axis arrow. The horizontal axis represents time and time increases from the left side of the plot to the right side of the plot. Trace 504 represents the propulsion pedal position.

The third plot from the top of FIG. 5 is a plot of an estimated after treatment device temperature versus time. The vertical axis represents the estimated after treatment device temperature and estimated after treatment device temperature increases in the direction of the vertical axis arrow. The horizontal axis represents time and time increases from the left side of the plot to the right side of the plot. Trace 506 represents the after treatment device temperature. Horizontal line 550 represents an upper threshold or limit not to be exceeded and horizontal line 552 represents an after treatment light off temperature.

The fourth plot from the top of FIG. 5 is a plot of engine exhaust gas temperature versus time. The vertical axis represents engine exhaust gas temperature at the exhaust flange upstream of the engine exhaust after treatment device. The horizontal axis represents time and time increases from the left side of the plot to the right side of the plot. Trace 508 represents the engine exhaust gas temperature.

The fifth plot from the top of FIG. 5 is a plot of an engine exhaust gas after treatment device reactivation state versus time. The vertical axis represents the reactivation state of the engine exhaust gas after treatment device. The engine exhaust gas after treatment device is being reactivated (e.g., via supplying hydrocarbons to the after treatment device) when trace 510 is at a higher level near the vertical axis arrow. The engine exhaust gas after treatment device is not being reactivated when trace 510 is at a lower level near the horizontal axis. Trace 510 represents the engine exhaust gas after treatment device reactivation state, The sixth plot from the top of FIG. 5 is a plot of reactivation fuel flow rate versus time. The vertical axis represents reactivation fuel flow rate and the reactivation fuel flow rate increases in the direction of the vertical axis arrow. The horizontal axis represents time and time increases from the left side of the plot to the right side of the plot. Trace 512 represents the reactivation fuel flow rate.

At time t10, the engine state is running (e.g., rotating and combusting fuel). The propulsion pedal is applied and the estimated after treatment device temperature is above level 552 and below level 550. The engine exhaust temperature is at a higher level and the engine exhaust gas after treatment device is not being reactivated. The reactivation fuel flow rate is zero.

At time t11, the propulsion pedal is fully released while the engine is running. The catalyst temperature and other variables are at their previous levels. Shortly after time t11, the engine enters fuel cut-out mode and the estimated after treatment device temperature begins to cool as the engine pumps a small amount of air to the after treatment device. The engine exhaust temperature begins to cool and the engine exhaust gas after treatment device is not be reactivated. The reactivation fuel flow rate is zero.

At time t12, the engine exits fuel cut-out mode in response to driver demand increasing as the position of the propulsion pedal increases. The engine exhaust gas temperature also increases as engine cylinders are reactivated (not shown). Reactivation of the engine exhaust gas after treatment device begins and reactivation fuel flow to the engine exhaust gas after treatment device increases. The estimated exhaust gas after treatment device temperature is increased due to activating cylinders and supplying fuel to the engine exhaust gas after treatment device.

Between time t12 and time t13, the amount of reactivation fuel flow is increased and then it is decreased in response to the estimated exhaust after treatment device temperature approaching threshold 550. The amount of reactivation fuel flow may be adjusted via adjusting fuel injection timing. Thus, by adjusting fuel injection timing, temperature of the exhaust after treatment device may be regulated.

At time t13, the catalyst reactivation ceases and the reactivation fuel flow rate is reduced to zero. Catalyst reactivation may cease in response to delivering a desired amount of fuel to the exhaust after treatment device or in response to output of a NOx sensor.

In this way, temperature of an after treatment device may be estimated and controlled during reactivation of an engine exhaust after treatment device. In particular, the after treatment device temperature may be regulated via adjusting a timing of fuel injection.

Referring now to FIG. 6, a graphic depiction of a fuel cloud 602 that may form in an exhaust system is shown. Fuel cloud 602 may receive fuel from fuel vapor storage canister 203 when the canister purge valve is open as indicated by arrow 604. Fuel cloud 602 may also receive fuel from fuel injectors 66 as indicated by arrow 606. Fuel cloud 602 may provide fuel to exhaust after treatment device 70 as indicated by arrow 608.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
operating an engine in a fuel cut-out mode wherein the engine rotates without injecting fuel to the engine via fuel injectors;
delivering fuel to the engine via a fuel vapor canister while operating the engine in the fuel cut-out mode;
estimating a temperature of an exhaust after treatment device via a controller, the controller estimating the temperature of the exhaust after treatment device based on combusting fuel supplied from the fuel vapor canister in the exhaust after treatment device while operating the engine in the fuel cut-out mode;
delivering oxygen to the exhaust after treatment device during the fuel cut-out mode;
exiting the fuel cut-out mode and reactivating the exhaust after treatment device via combusting a rich air-fuel ratio in the engine after delivering oxygen to the exhaust after treatment device during the fuel cut-out mode;
reducing an amount of fuel injected to reactivate the exhaust after treatment device in response to the temperature of the exhaust after treatment device; and
adjusting a position of a throttle in response to the temperature, wherein estimating the temperature of the exhaust after treatment device includes estimating an amount of fuel combusting in the exhaust after treatment device after leaving a fuel cloud during the fuel cut-out mode, wherein estimating the temperature is further based on a mass of fuel supplied to reactivate the exhaust after treatment device.

2. The method of claim 1, further comprising decreasing an opening amount of the purge control valve in response to the temperature of the exhaust after treatment device exceeding a threshold temperature.

3. The method of claim 1, where the fuel cloud includes fuel supplied from the fuel vapor canister.

4. The method of claim 1, further comprising estimating an amount of fuel stored in the fuel cloud.

5. A system, comprising:
an engine including a plurality of cylinders having a plurality of fuel injectors and an after treatment device;
a canister including stored fuel vapors;
a purge control valve in fluidic communication with the canister; and
a controller including executable instructions stored in non-transitory memory that cause the controller to adjust a position of the purge control valve when operating the engine in a fuel cut-out mode, and executable instructions to adjust a position of a throttle and a purge control valve while operating in the fuel cut-out mode in response to an estimate of a temperature of the after treatment device while fuel vapors flow from the purge control valve to the after treatment device, wherein the estimate of the temperature of the after treatment device includes estimating an amount of fuel combusting in the after treatment device after leaving a fuel cloud during the fuel cut-out mode, and where the estimate is further based on a mass of fuel supplied to reactivate the exhaust after treatment device.

6. The system of claim 5, wherein the fuel vapors flow from the purge control valve to the after treatment device via at least partially opening the purge control valve.

7. The system of claim 5, where the mass of fuel leaving the fuel cloud is based on an air mass flow rate through an engine.

8. The system of claim 7, where opening the purge control valve supplies fuel to the fuel cloud.

9. The system of claim 5, where adjusting the position of the purge control valve includes closing the purge control valve in response to the estimate of the temperature being greater than a threshold temperature.

10. The system of claim 5, further comprising additional instructions to estimate an amount of fuel being combusted via the after treatment device.

11. The system of claim 5, further comprising additional instructions to adjust an exotherm temperature in response to exiting a fuel vapor canister purge mode.

12. An engine operating method, comprising:
operating an engine in a fuel cut-out mode via a controller wherein the engine rotates without injecting fuel to the engine via fuel injectors;
delivering fuel to the engine via a fuel vapor canister while operating the engine in the fuel cut-out mode;
estimating an amount of fuel being delivered to the engine via the fuel vapor canister;
estimating an amount of fuel stored in a fuel cloud, the fuel cloud containing fuel from the fuel vapor canister;
estimating an amount of fuel exiting the fuel cloud and combusting in an exhaust after treatment device, where the amount of fuel exiting the fuel cloud is based on an air mass flow rate through the engine;
estimating a temperature of the exhaust after treatment device via the controller, the controller estimating the temperature of the exhaust after treatment device based on the amount of fuel exiting the fuel cloud and being combusted in the exhaust after treatment device during the fuel cut-out mode; and
adjusting a position of a throttle and a purge control valve in response to the temperature.

13. The method of claim 12, further comprising:
delivering oxygen to the exhaust after treatment device during the fuel cut-out mode;
exiting the fuel cut-out mode and reactivating the exhaust after treatment device via combusting a rich air-fuel ratio in the engine after delivering oxygen to the exhaust after treatment device during the fuel cut-out mode; and
reducing an amount of fuel injected to reactivate the exhaust after treatment device in response to the temperature of the exhaust after treatment device.

14. The method of claim 13, further comprising closing a purge control valve in response to the amount of fuel being delivered to the engine via the fuel vapor canister.

* * * * *